(12) United States Patent
Choi et al.

(10) Patent No.: US 8,947,211 B2
(45) Date of Patent: Feb. 3, 2015

(54) COMMUNICATION DATA PROTECTION METHOD BASED ON SYMMETRIC KEY ENCRYPTION IN RFID SYSTEM, AND APPARATUS FOR ENABLING THE METHOD

(75) Inventors: Doo Ho Choi, Daejeon (KR); Yong-Je Choi, Daejeon (KR); Ho Won Kim, Daejeon (KR); Kyo Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1063 days.

(21) Appl. No.: 12/747,447

(22) PCT Filed: Jun. 17, 2008

(86) PCT No.: PCT/KR2008/003402
§ 371 (c)(1),
(2), (4) Date: Jun. 10, 2010

(87) PCT Pub. No.: WO2009/075434
PCT Pub. Date: Jun. 18, 2009

(65) Prior Publication Data
US 2010/0277287 A1 Nov. 4, 2010

(30) Foreign Application Priority Data
Dec. 11, 2007 (KR) ........................ 10-2007-0127977

(51) Int. Cl.
*H04Q 5/22* (2006.01)
*H04L 9/32* (2006.01)

(52) U.S. Cl.
CPC ......... *H04L 9/3273* (2013.01); *H04L 2209/805* (2013.01)
USPC ..... 340/10.42; 340/5.61; 340/5.26; 340/10.1; 340/572.1; 380/270; 713/166

(58) Field of Classification Search
CPC ...................... H04L 2209/805; H04L 9/3273
See application file for complete search history.

(56) References Cited

U.S. PATENT DOCUMENTS 8,198,984 B2 * 6/2012 Amtmann ............... 340/10.1
2003/0112972 A1 * 6/2003 Hattick et al. ............ 380/46
(Continued)

FOREIGN PATENT DOCUMENTS

KR 10-2006-0028952 A 4/2006
KR 10-2006-0090383 A 8/2006
(Continued)

OTHER PUBLICATIONS

International Search Report mailed on Sep. 2, 2008 in International Application No. PCT/KR2008/003402.
(Continued)

*Primary Examiner* — Benjamin C Lee
*Assistant Examiner* — Rajsheed Black-Childress
(74) *Attorney, Agent, or Firm* — Kile Park Reed & Houtteman PLLC (57) ABSTRACT

A communication data protection method based on symmetric key encryption, and an apparatus for enabling the method are provided. A communication data protection method using a Radio Frequency Identification (RFID) reader, the method including: receiving, from a tag, tag information including security parameter information and an encrypted Unique Item Identifier (UII); extracting the UII based on the security parameter information; transmitting, to the tag, a request message including a challenge value for replay prevention; and performing a tag authentication by receiving, from the tag, a response message including a handle and the challenge value.

15 Claims, 13 Drawing Sheets

(56) References Cited

U.S. PATENT DOCUMENTS

| | | | |
|---|---|---|---|
| 2004/0039703 A1* | 2/2004 | Novoselsky et al. | 705/50 |
| 2005/0058292 A1* | 3/2005 | Diorio et al. | 380/270 |
| 2006/0008083 A1* | 1/2006 | Saito | 380/28 |
| 2006/0012473 A1 | 1/2006 | Bishop et al. | |
| 2006/0039558 A1* | 2/2006 | Morii et al. | 380/46 |
| 2006/0077034 A1* | 4/2006 | Hillier | 340/5.61 |
| 2007/0008070 A1* | 1/2007 | Friedrich | 340/10.1 |
| 2007/0077034 A1 | 4/2007 | Okuyama et al. | |
| 2007/0177738 A1* | 8/2007 | Diorio et al. | 380/270 |
| 2008/0168544 A1* | 7/2008 | von Krogh | 726/6 |
| 2008/0219447 A1* | 9/2008 | McLaughlin | 380/270 |
| 2009/0015385 A1* | 1/2009 | Teuwen et al. | 340/10.51 |
| 2009/0251289 A1* | 10/2009 | Amtmann | 340/10.1 |
| 2012/0206243 A1* | 8/2012 | Butler et al. | 340/10.51 |

FOREIGN PATENT DOCUMENTS

| | | |
|---|---|---|
| KR | 10-2006-0121815 A | 11/2006 |
| KR | 10-2007-0003205 A | 1/2007 |
| KR | 10-2007-0006525 A | 1/2007 |

OTHER PUBLICATIONS

Written Opinion of the International Searching Authority mailed on Sep. 2, 2008 in International Application No. PCT/KR2008/003402.

* cited by examiner

| PREAMBLE | RN16 | SEC PARAM | PC | UII | CRC-16 |

FIG. 6

| # OF BITS | COMMAND | RN | CHALLENGE | CRC-16 |
|---|---|---|---|---|
| | 8 | 16 | 16 | 16 |
| DESCRIPTION | 11000001 | PRIOR RN16 OR HANDLE | RANDOM R | |

FIG. 7

| # OF BITS | RN | RESPONSE | CRC-16 |
|---|---|---|---|
| DESCRIPTION | 16 | 16 | 16 |
| | HANDLE OR NEW RN16 | R OF SECURE REQ_RN | |

| # OF BITS | COMMAND | SECPARAM | RN | CRC-16 |
|---|---|---|---|---|
| | 16 | 16 | 16 | 16 |
| DESCRIPTION | 1111000001 00000000 | (SECPARAM) ⊕ RN16 | HANDLE | |

FIG. 10

|  | HEADER | RN | CRC-16 |
|---|---|---|---|
| # OF BITS | 1 | 16 | 16 |
| DESCRIPTION | 0 | HANDLE |  |

FIG. 12

| # OF BITS | COMMAND | KEY | RN | CRC-16 |
|---|---|---|---|---|
| DESCRIPTION | 16 | 16 | 16 | 16 |
| | 1111000001 00000001 | (1/8 AES KEY)⊕RN16 | HANDLE | |

FIG. 13

|  | RN | CRC-16 |
|---|---|---|
| # OF BITS | 16 | 16 |
| DESCRIPTION | HANDLE | |

FIG. 14

|  | HEADER | RN | CRC-16 |
|---|---|---|---|
| # OF BITS | 1 | 16 | 16 |
| DESCRIPTION | 0 | HANDLE | |

COMMUNICATION DATA PROTECTION METHOD BASED ON SYMMETRIC KEY ENCRYPTION IN RFID SYSTEM, AND APPARATUS FOR ENABLING THE METHOD

TECHNICAL FIELD

The present invention relates to a wireless interface, for example, protection of communication data between a Radio Frequency Identification (RFID) reader and an RFID tag, and more particularly, to a communication data protection method and apparatus based on symmetric key encryption which includes mutual authentication between the RFID tag and the RFID reader in an RFID wireless interface environment.

This work was supported by the IT R&D program of MIC/IITA [2005-S-088-03, Development of security technology for secure RFID/USN service].

BACKGROUND ART

Generally, a Radio Frequency Identification (RFID) system is classified into a mutual induction scheme and an electromagnetic wave scheme depending on a mutual communication scheme between a reader and a tag, and is classified into an active type and a passive type depending on whether the tag operates under its own power. Also, the RFID system is classified into a long wave, a medium wave, a short wave, an ultrashort wave, and a microwave depending on a used frequency.

Since all data packets transceived between an RFID tag, and more particularly, a passive tag, for example a tag in accordance with ISO/IDC 18000-6 Type C standard, are exposed to readers in an electric wave coverage, all the data packets are in a weak security state in that information in the packets may be eavesdropped by a malicious third person.

In the weak security state, there are many risks that personal information stored in a tag memory or other important information may be stolen or forged. Also, when an unauthenticated third person accesses the tag memory and deletes some data items or writes random information, the reader and the tag exchanges invalid data. A security method using a password and a key value between a tag and a reader is disclosed in order to solve the above-described problem, however, this may not prevent a replay attack and may simply limit access to the tag memory.

DISCLOSURE OF INVENTION

Technical Goals

The present invention provides a protection method for communication data between a Radio Frequency Identification (RFID) tag and an RFID reader using encryption based on symmetric key encryption between the RFID tag and the RFID reader in an RFID wireless interface environment.

The present invention also provides a method and apparatus for protecting transceived data needing security between an RFID tag and an RFID reader besides simply limiting access to a tag memory.

The present invention also provides a transceiving data format for protection of communication data between an RFID tag and an RFID reader.

Technical solutions

According to an aspect of the present invention, there is provided a communication data protection method using a Radio Frequency Identification (RFID) reader, the method including: receiving, from a tag, tag information including security parameter information and an encrypted Unique Item Identifier (UII); extracting the UII based on the security parameter information; transmitting, to the tag, a request message including a challenge value for replay prevention; and performing a tag authentication by receiving, from the tag, a response message including a handle and the challenge value.

According to another aspect of the present invention, there is provided a communication data protection method using an RFID tag, the method including: transmitting, to a reader, tag information including security parameter information and an encrypted UII; receiving, from the reader, a request message including a challenge value for replay prevention; and generating a handle in response to the request message and transmitting, to the reader, a response message including the handle and the challenge value.

According to still another aspect of the present invention, there is provided an RFID tag including: a memory to store a security parameter and a security key; a signal processing unit to generate a One Time Pad OTP value based on an output feedback mode using the security key and encrypt a transmission message to be transmitted to a reader using the OTP value; and a transmission unit to transmit the security parameter and the encrypted transmission message to the reader.

According to yet another aspect of the present invention, there is provided a communication data protection method, the method including: receiving a random value request message from a reader; transmitting, using a tag, a random value to the reader by generating the random value; receiving, from the reader, a setting command message including security parameter setting information encrypted by the random value; and setting a security parameter value based on the security parameter setting information.

According to a further aspect of the present invention, there is provided a communication data protection method, the method including: receiving a random value request message from a reader; transmitting, using a tag, a random value to the reader by generating the random value; receiving, from the reader, a key setting command message including security key setting information encrypted by the random value; and setting a security key in the memory based on the security key setting information, and transmitting a response message to the reader.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
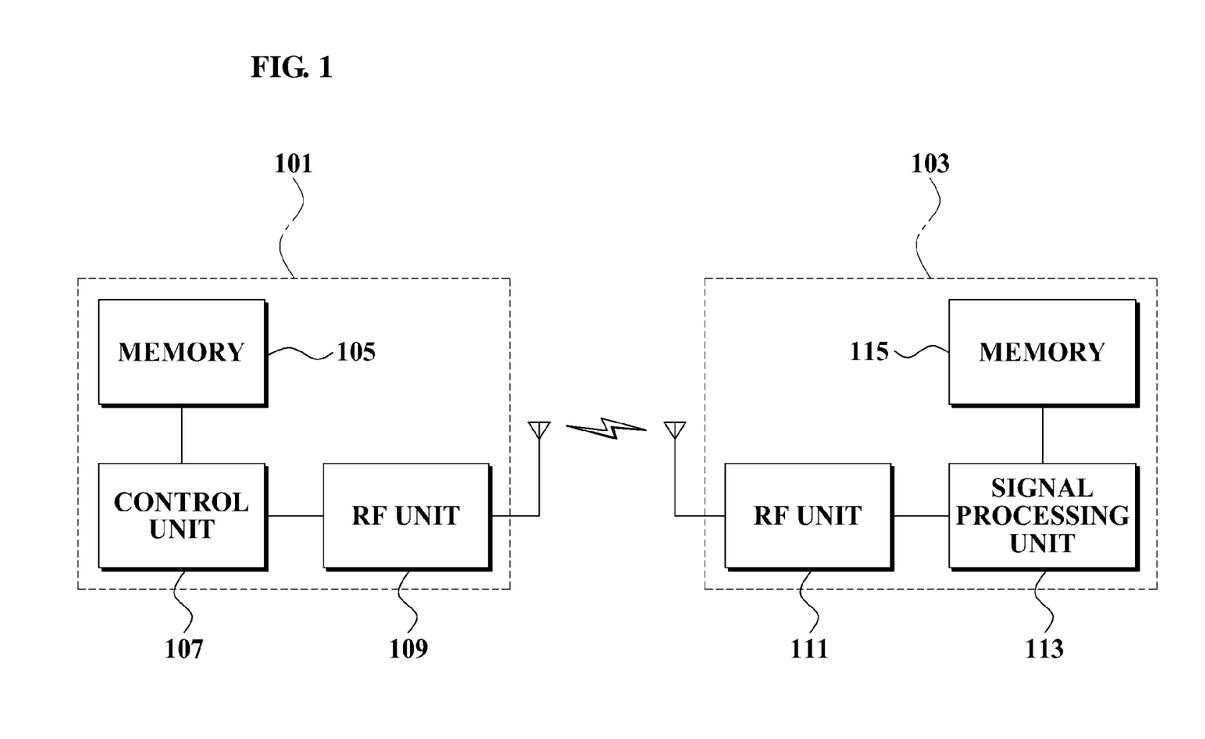
FIG. 1 is a block diagram illustrating a configuration of a Radio Frequency Identification (RFID) system according to an exemplary embodiment of the present invention.

FIG. 1 is a block diagram illustrating a configuration of a Radio Frequency Identification (RFID) system according to an exemplary embodiment of the present invention.

As illustrated in FIG. 1, the RFID system includes a tag to be adhered to a random place and store article (object) information (an electronic tag or a transponder; hereinafter, simply referred to as 'a tag'), and an RFID reader (reader or interrogator) to read or write information from/to the tag.

Referring to FIG. 1, an RFID reader 101 includes a control unit 107 to control a general operation of the reader, a reader memory 105 to store a command word and programs necessary for a reader operation, and a Radio Frequency (RF) unit 109 to transceive an RF signal with the tag.

The control unit 107 performs an access process to a security inventory and the tag according to the present exemplary embodiment of the present invention.

The reader memory 105 includes a program memory and data memories. Programs for controlling the general operation of the reader and security-related data according to the present exemplary embodiment of the present invention are stored in the program memory.

Referring to FIG. 1, an RFID tag 103 includes a signal processing unit 113 to perform a signal processing function of the tag, a tag memory 115 to store a command word necessary for a tag operation and programs, and an RF unit 111 to transceive the RF signal with the reader.

The signal processing unit 113 restores a reader signal received by the RF unit 111, and generates a message to be transmitted to the reader. Also, the signal processing unit 113 performs the access process to the security inventory and the tag according to the present exemplary embodiment of the present invention.

The tag memory 115 includes a program memory and data memories. Programs for controlling the general operation of the tag and security-related data according to the present exemplary embodiment of the present invention are stored in the program memory.

Figure 2:
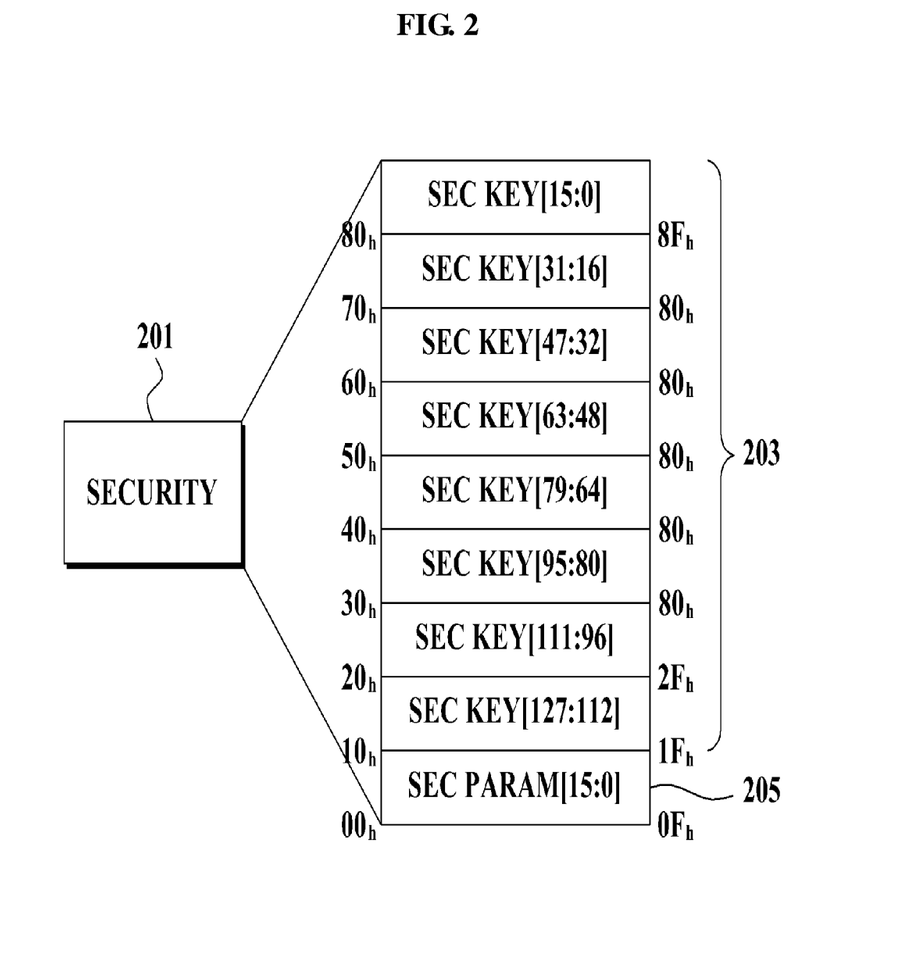
FIG. 2 illustrates a structure of a protected memory bank of an RFID tag memory according to an exemplary embodiment of the present invention.

FIG. 2 illustrates a structure of a security memory bank of an RFID tag memory according to an exemplary embodiment of the present invention.

As illustrated in FIG. 2, the security memory bank (Security) 201 includes a 128-bit security key (Sec key) area 203 and a 16-bit security parameter (Sec Param) area 205.

The security parameter area 205 includes an index of a group including a security key used by a tag, and information about which symmetric key encryption algorithm is used.

Figure 3:
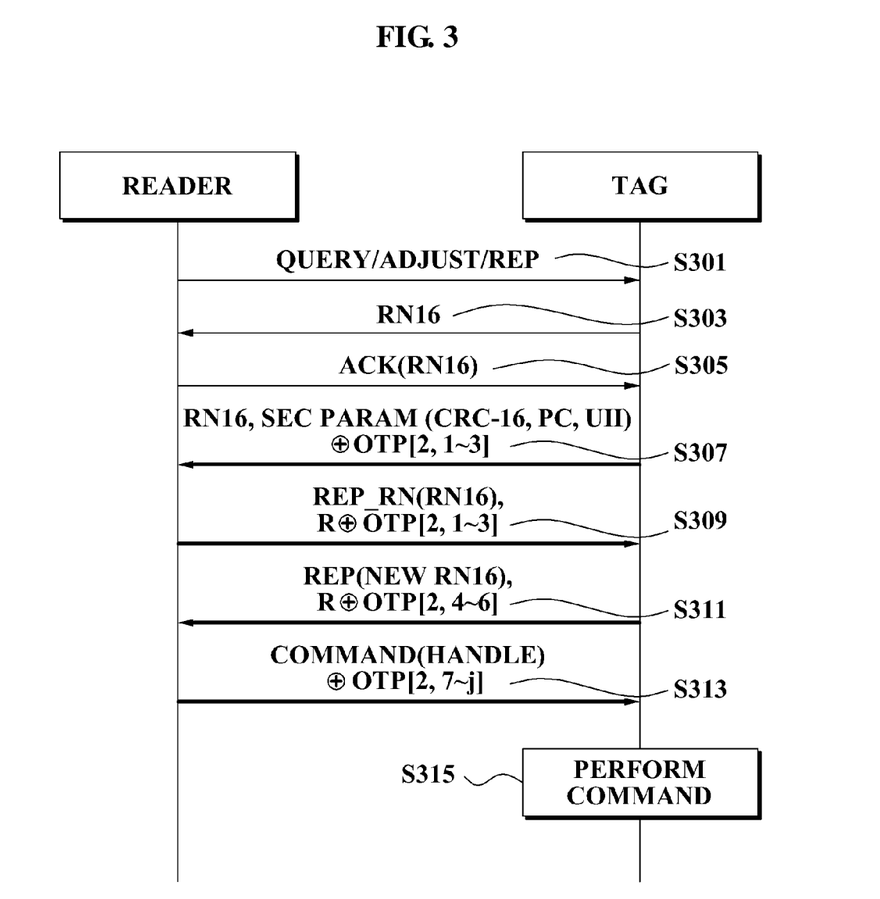
FIG. 3 illustrates an access process to a security inventory and a tag according to an exemplary embodiment of the present invention.

FIG. 3 illustrates an access process to a security inventory and a tag according to an exemplary embodiment of the present invention.

As illustrated in FIG. 3, a reader performs inventory processes S301 to S307 in order to acquire information from a specific tag.

The inventory processes S301 to S307 are processes for selecting the specific tag from a plurality of tags existing in an RF coverage, and acquiring tag information (Protocol control bits (PC) and Unique Item Identifier (UII)) of the selected tag.

In operation S301, the reader queries the tag using a command word such as Query, QueryAdjust, and QueryRep. In operation S303, when a slot (a Q value) of the tag is '0', the queried tag transmits a predetermined random value (an RN 16 value) to the reader. In this instance, the Q value denotes a time slot so that the plurality of tags may communicate with the reader without a collision. Also, the queried tag drives a symmetric key-based security algorithm using the RN16 value transmitted to the reader, a security parameter value, and a security key value. A detailed description thereof is provided as follows.

In operation S305, when the reader receives the RN16 value from the tag without a collision, the reader transmits an acknowledgment (ACK) message including RN16 information to the tag.

In operation S307, when the tag receives the ACK message, the tag transmits a security response message in response to the ACK message using the security parameter value and the RN16 value.

Figure 4:
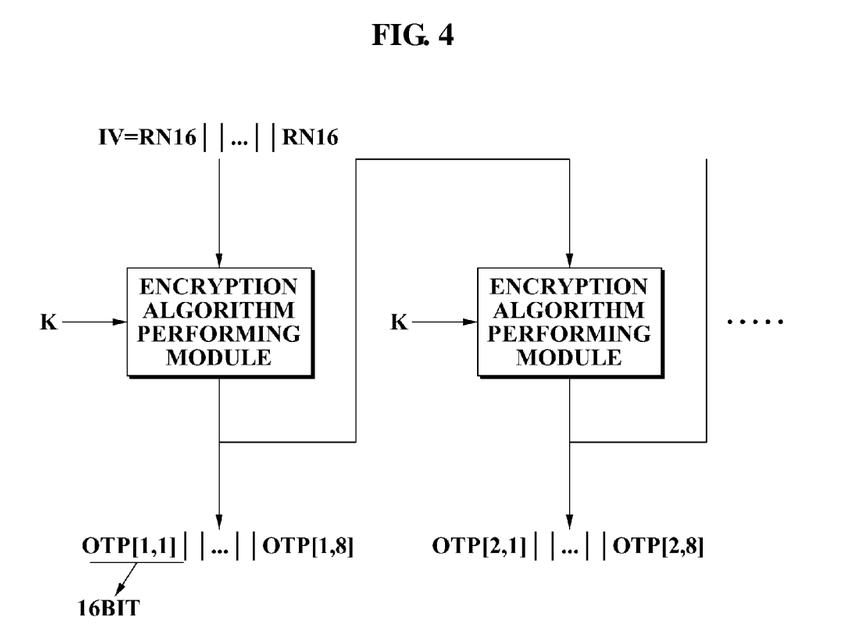
FIG. 4 illustrates a symmetric key-based encryption scheme according to an exemplary embodiment of the present invention.
Figure 5:
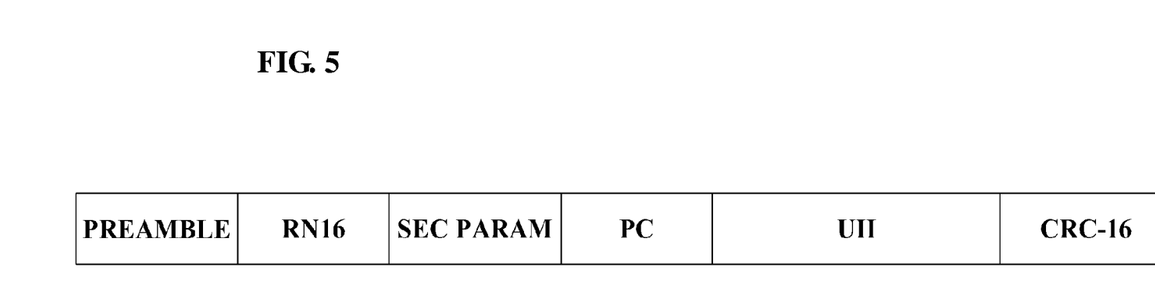
FIG. 5 illustrates a configuration of a security response message according to an exemplary embodiment of the present invention.

In this instance, as illustrated in FIG. 5, the security response message includes the tag information, that is, the PC and the UII, and the PC after the security parameter, the UII, and an error detection code (for example, Cyclic Redundancy Check (CRC)-16) are encrypted by a One Time Pad OTP and are transmitted. As illustrated in FIG. 4, an OTP value is a value generated by the symmetric key-based encryption algorithm, and a description thereof is provided as follows.

The reader performs access processes, that is, operations S309 to S313, after performing the inventory processes, that is, operations S301 to S307.

The access processes, that is, operations S309 to S313 are processes for acquiring information stored in a memory of the tag selected during the inventory processes, and transmitting various commands such as read, write, and lock.

First, when the reader receives the security response message, the reader recognizes that the tag is a security tag, by using the RN16 value included in the security response message. The reader subsequently extracts a security key value of the tag by analyzing the security parameter value, and decrypts the tag information, that is, the PC, the UII, and the CRC-16 by selecting the security key value of the reader corresponding to the extracted security key. In this instance, the reader may decrypt the tag information by the symmetric key-based encryption algorithm using the security key value of the reader.

According to exemplary embodiments, the message transceived in all operations after operation 5307 is encrypted and transmitted. Specifically, the message transceived in the operations after operation 5307 is calculated by using an exclusive or (XOR) with the OTP value and is encrypted.

Figure 6:
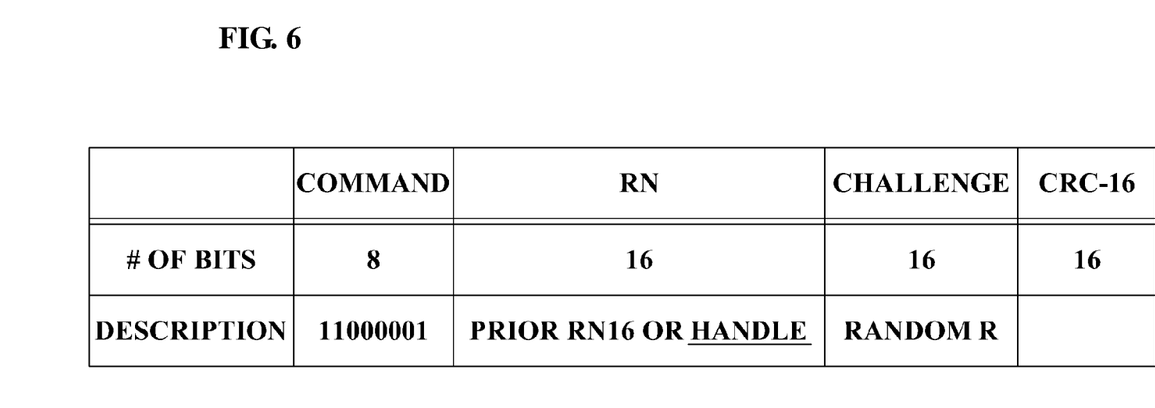
FIG. 6 illustrates a configuration of a security Req_RN message according to an exemplary embodiment of the present invention.

In operation S309, the reader transmits a security request (Req_RN) message in order to transmit a command to the tag. As illustrated in FIG. 6, the Req_RN message includes the RN value received from the tag and the challenge value (random R) for preventing a replay attack.

Figure 7:
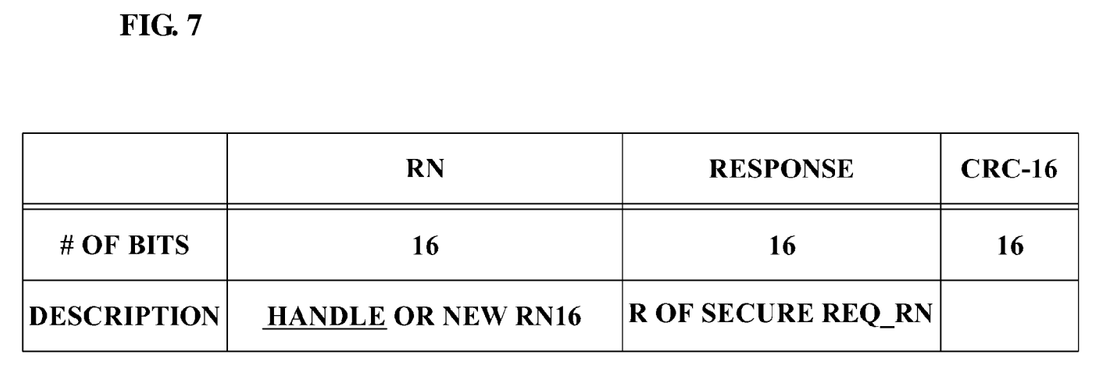
FIG. 7 illustrates a configuration of a response message in response to the security Req_RN message according to an exemplary embodiment of the present invention.

In operation S311, when the tag receives the Req_RN message, the tag generates a new RN16 value (new RN), and transmits a response message to the reader using the new RN value and the challenge value received from the tag. Here, the response message in response to the Req_RN message is configured as illustrated in FIG. 7. When the reader receives, from the tag, the response message in response to the Req_RN message, the reader performs an authentication of the tag. Specifically, when the reader decrypts the response message and extracts the challenge value, and the extracted challenge value is equal to a challenge value transmitted by the reader, the reader recognizes the tag transmitting the response message as a tag having an accurate security key.

The reader subsequently uses the new RN16 value as a tag authentication signal, that is, a handle.

Accordingly, in operation S313, the reader transmits a command message including the handle to the tag. In this instance, as described above, the command message is encrypted by using the exclusive or (XOR) with the OTP value.

In operation S315, when the tag receives the command message, the tag performs an operation according to the received command message when a handle value is equal to the new RN value transmitted by the tag.

As described above, the tag indirectly authenticates the reader by verifying the handle value.

FIG. 4 illustrates a symmetric key-based encryption scheme according to an exemplary embodiment of the present invention.

As illustrated in FIG. 4, the symmetric key-based encryption scheme according to the present exemplary embodiment of the present invention may use an Output Feedback (OFB) operation mode using only an encryption module for efficiency of realization.

Referring to FIG. 4, the symmetric key-based encryption scheme generates first output values OTP[1,1] to OTP[1,8] of a symmetric key encryption algorithm performing module using an Initial Vector(IV) including a connection of the RN16 values, and output values OTP[2,1] to OTP[2,8] of a second encryption algorithm performing module using an input value of a second symmetric key encryption algorithm performing module.

As described above, when the OFB mode is performed, a plurality of OTP values is continuously generated.

The plurality of OTP values is successively selected not to be overlapped, and is used for encrypting (performing the XOR calculation of) a transmission message. Specifically, using the plurality of OTP values so as to not be duplicated denotes using OTP[2,4~6] in operation 5311 when OTP[2, 1~3] is used in operation S307 of FIG. 3.

FIG. 5 illustrates a configuration of a security response message according to an exemplary embodiment of the present invention.

As illustrated in FIG. 5, the security response message includes a preamble, an RN16, a security parameter, tag information (PC and UII), and a CRC-16. In this instance, as described above, the tag information and the CRC-16 are encrypted by an OTP and are transmitted to a reader.

FIG. 6 illustrates a configuration of a security Req_RN message according to an exemplary embodiment of the present invention. FIG. 7 illustrates a configuration of a response message for responding to the security Req_RN message according to an exemplary embodiment of the present invention.

As illustrated in FIG. 6, the security Req_RN message includes an RN field, a challenge value field, and a CRC-16 field. The challenge value may be a random 16-bit value (R).

As illustrated in FIG. 7, the response message for responding to the security Req_RN message includes a new RN field, a response field, and a CRC-16 field. The response field enables a reader to authenticate a tag by inputting a challenge value received from the reader.

The reader and the tag may prevent a replay attack of at least one of an unauthenticated reader and an unauthenticated tag by using the security Req_RN message and the response message in response to the security Req_RN message.

The RFID tag for performing the access process to the security inventory and the tag includes the memory 115 to store the security parameter and the security key, the signal processing unit 113 to generate the OTP value based on the OFB mode using the security key and encrypt the transmission message to be transmitted to the reader using the OTP value, and the RF unit 111 to transmit the security parameter and the encrypted transmission message to the reader.

Figure 8:
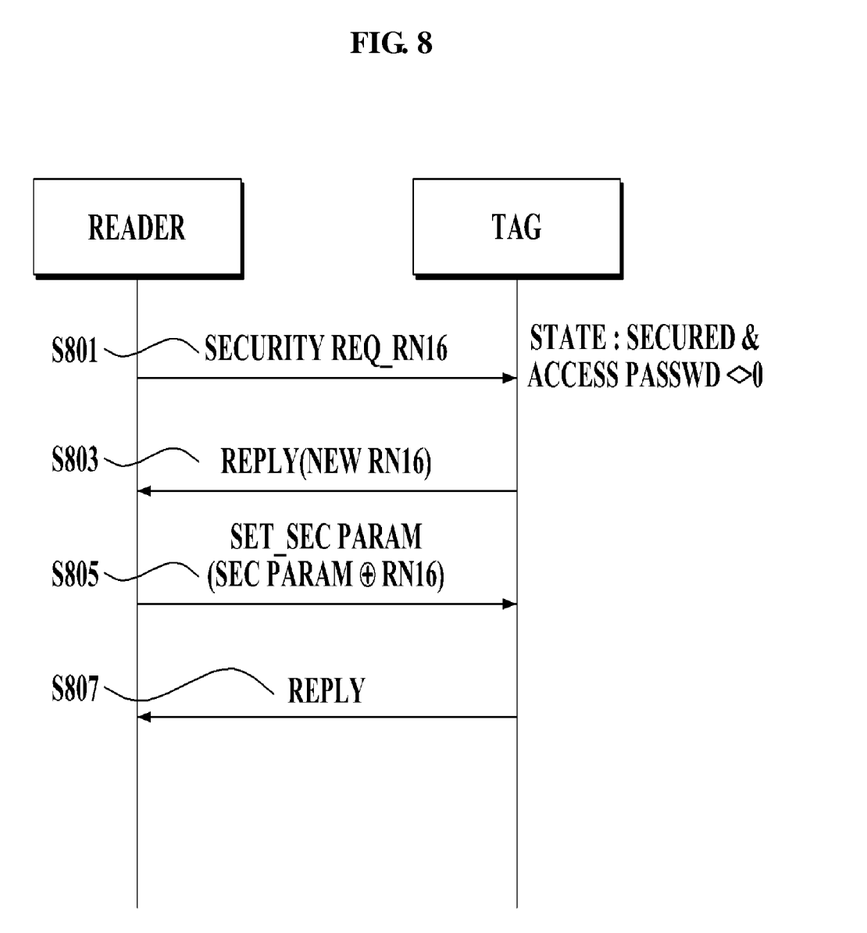
FIG. 8 illustrates a process of setting a security parameter value according to an exemplary embodiment of the present invention.

FIG. 8 illustrates a process of setting a security parameter value according to an exemplary embodiment of the present invention.

As illustrated in FIG. 8, in operation S801, a reader transmits a security Req_RN command message to a tag. In operation S803, the tag generates a new RN value, and transmits, to the reader, a response message including the new RN (handle) value generated in a response message in response to the security Req_RN command message.

In operation S805, the reader encrypts (performs an XOR calculation of) security parameter setting information using the received new RN value, and transmits a setting command message, that is, Set_Sec Param, including the encrypted security parameter setting information to the tag.

In this instance, the security parameter setting information may be an initial value of a security parameter, and may be a changed security parameter value when the security parameter value is stored in the tag in advance.

The tag authenticates the reader by the new RN (handle) value, and sets (changes) a security parameter value of a security memory bank based on the security parameter setting information. In operation S807, when a security parameter setting of the security memory bank is completed, the tag subsequently transmits, to the reader, a report message reporting that the setting is completed.

Figure 9:
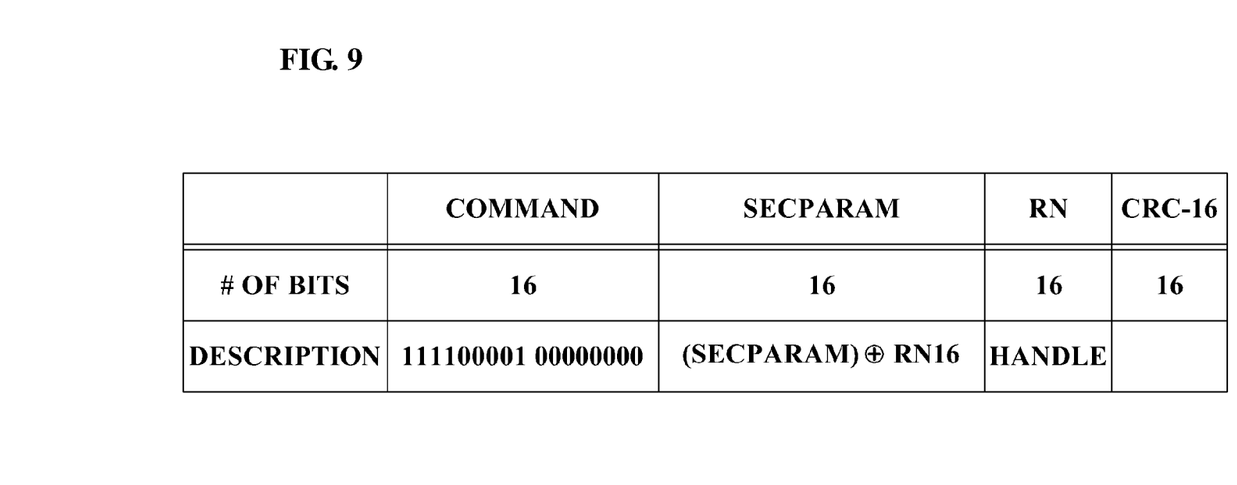
FIG. 9 illustrates a configuration of a setting command message of FIG. 8.
Figure 10:
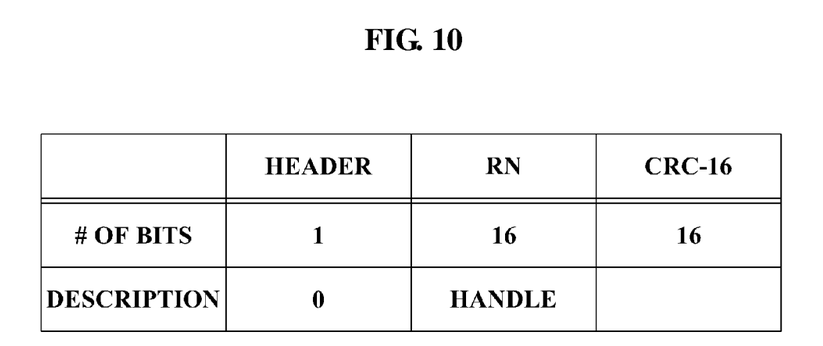
FIG. 10 illustrates a configuration of a report message of FIG. 8.

FIG. 9 illustrates a configuration of a setting command message of FIG. 8, and FIG. 10 illustrates a configuration of a report message of FIG. 8.

As illustrated in FIG. 9, a Set_Sec Param command message includes a command field, a security parameter field, an RN field, and a CRC-16 field. In this instance, the security parameter field includes the above-described encrypted security parameter setting information.

As illustrated in FIG. 10, a report message, that is, a response message in response to a report message, more specifically, a response message in response to a Set_Sec Param command message, includes a header field, an RN field, and a CRC-16 field.

Figure 11:
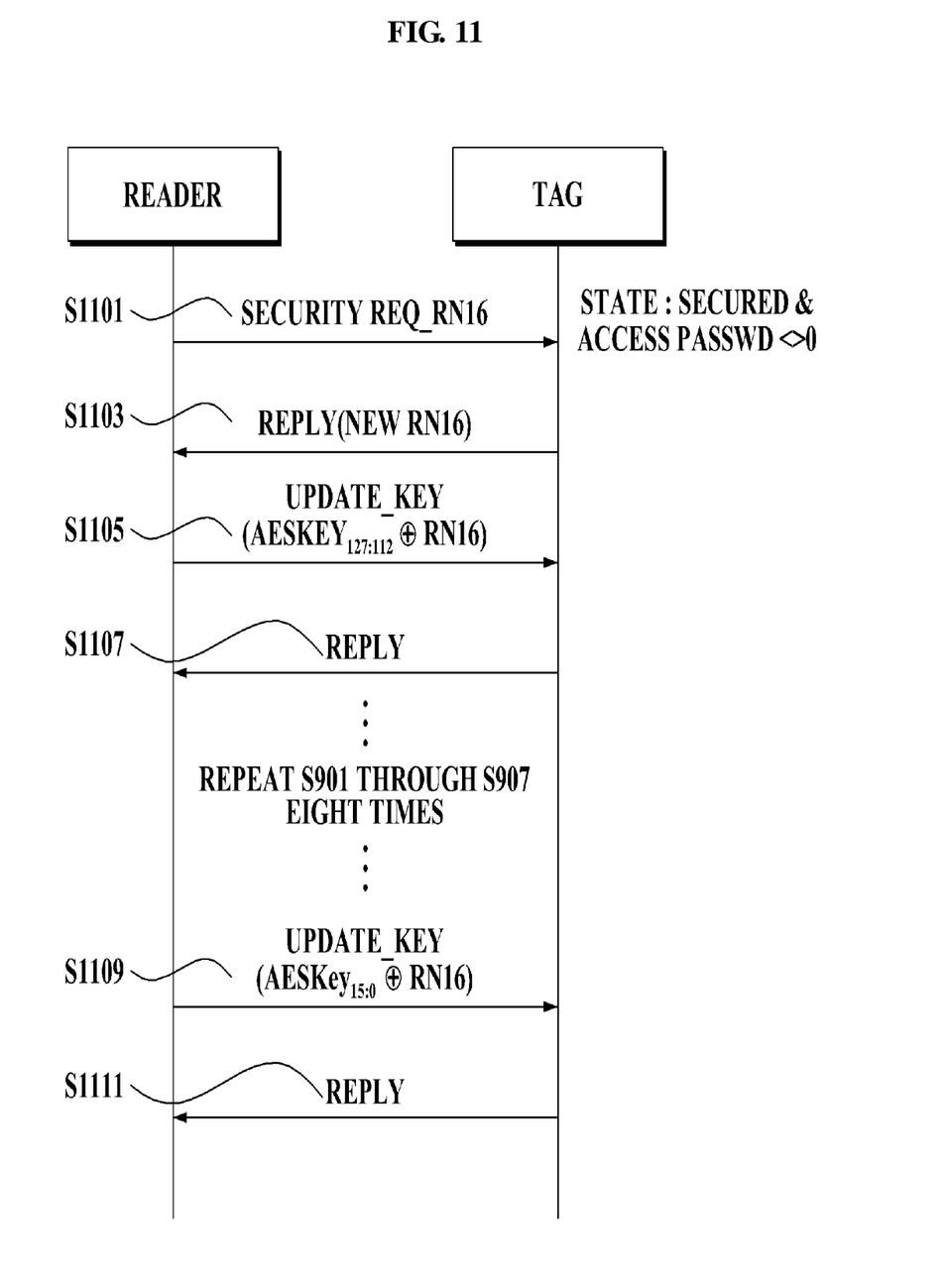
FIG. 11 illustrates a process of setting a security key value according to an exemplary embodiment of the present invention.

FIG. 11 illustrates a process of setting a security key value according to an exemplary embodiment of the present invention.

As illustrated in FIG. 11, in operation S1101, a reader transmits a security Req_RN command message to a tag. In operation S1103, the tag generates a new RN value and transmits a response message including the new RN (handle) value generated in the response message in response to the security Req_RN command message.

The reader encrypts (performs an XOR calculation of) a most significant 16-bit value of a security key to be set or changed, by using the received new RN value. In this instance, for example, the security key value may be an Advanced Encryption Standard (ASE) key.

In operation S1105, the reader transmits, to the tag, a security key update key (Update_Key) command message including the most significant 16-bit value of the encrypted security key.

When the tag receives the Update_Key command message, the tag decrypts the received Update_Key command message by the new RN value, and updates the security key stored in a memory based on the security key value.

In this instance, the security key value may be an initial value of the security key, and may be an updated security key value when the security key value is stored in the memory of the tag in advance.

In operation S1107, when a security key value updating of a security key value in a security memory bank is completed, the tag transmits, to the reader, a report message reporting that the update is completed, that is, an intermediate response in response to the Update_Key command.

Operations S1101 to S1107 are repeatedly performed based on an entire size of the security key. Accordingly, in operation S1109, for example, when the entire security key value is 128 bits, operations S1101 to S1107 are repeatedly performed eight times.

In operation S1111, when the updates of all security key values are completed by repeatedly performing operations S1101 to S1107, the tag transmits, to the reader, a final response, that is, a final response in response to the Update_Key command.

Figure 12:
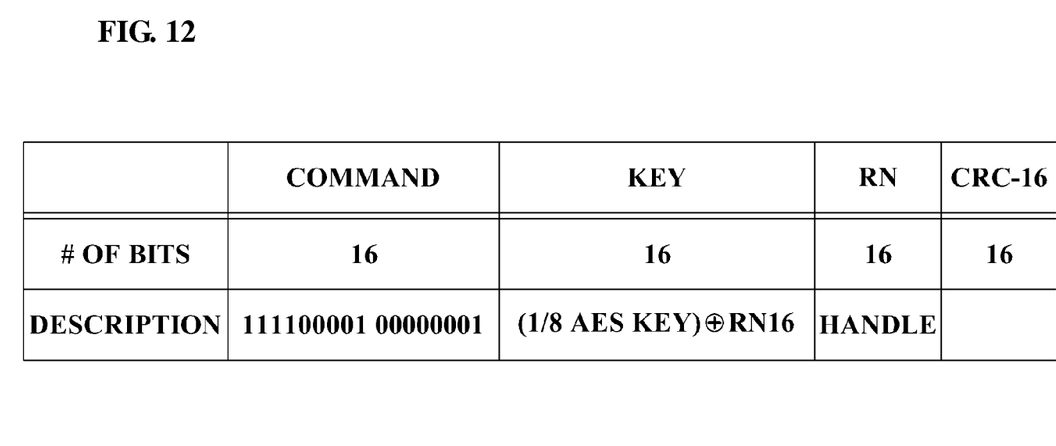
FIG. 12 illustrates a configuration of an Update_Key command message of FIG. 11.
Figure 13:
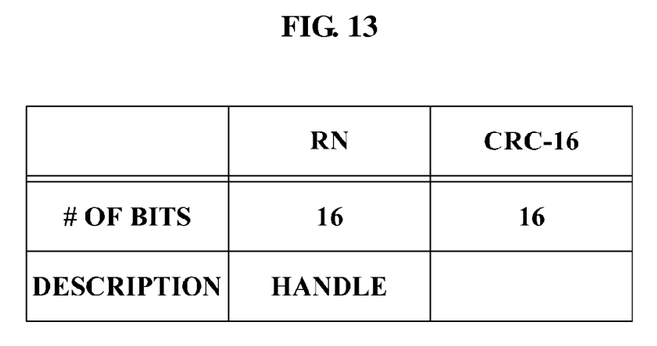
FIG. 13 illustrates a configuration of an intermediate response message in response to the Update_Key command message of FIG. 11.

FIG. 12 illustrates a configuration of an Update_Key command message of FIG. 11. FIG. 13 illustrates a configuration of an intermediate response message in response to the Update_Key command message of FIG. 11, and FIG. 14 illustrates a configuration of a final response message in response to the Update_Key command message of FIG. 11.

As illustrated in FIG. 12, the Update_Key command message includes a command field, a key field, an RN field, and a CRC-16 field. As described above, the key field includes an encrypted 16-bit security key value.

As illustrated in FIG. 13, the intermediate response message in response to the Update_Key command message includes an RN field and a CRC-16 field.

Figure 14:
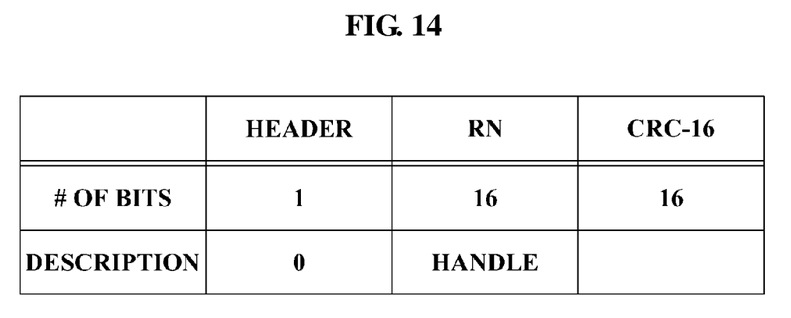
FIG. 14 illustrates a configuration of a final response message in response to the Update_Key command message of FIG. 11.

As illustrated in FIG. 14, the final response message in response to the Update_Key command message includes a header field, an RN field, and a CRC-16 field.

According to the present invention, there is provided an RFID reader which can authenticate a tag.

Also, according to the present invention, there is provided an RFID tag which can authenticate a reader.

Also, according to the present invention, there is provided a communication data protection method which can protect communication data transceived among RFID wireless interfaces, and more particularly, which can prevent a replay attack in an RFID wireless interface environment.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A communication data protection method using a Radio Frequency Identification (RFID) reader, the method comprising:
   receiving, from a tag, a security response message comprising tag information including security parameter information, protocol control bits, a cyclic redundancy check and an Unique Item Identifier, the protocol control bits, cyclic redundancy check and the unique item identifier encrypted by a One Time Pad using a One Time Pad value generated by a symmetric key-based encryption algorithm;
   extracting a security key value from the security parameter information;
   extracting the protocol control bits, cyclic redundancy check and the unique item identifier by decrypting the tag information using the security key value in the symmetric key-based encryption algorithm;
   transmitting, to the tag, a request message including a challenge value for replay prevention; and
   performing a tag authentication by receiving, from the tag, a response message including a handle and the challenge value,
   wherein the One Time Pad value is successively selected not to be overlapped among a plurality of One Time Pad values generated according to an Output Feedback (OFB) operation mode of the symmetric key-based encryption algorithm, and all messages transceived between the reader and the tag after the security response message is received are encrypted and transmitted.

2. The method of claim 1, further comprising:
   transmitting a reader command to the tag using the handle.

3. The method of claim 1, wherein all messages are encrypted using an exclusive or with the one time pad value.

4. The method of claim 1, wherein decrypting the tag information further comprises using a symmetric key value corresponding to the extracted security key value.

5. The method of claim 1, wherein the request message further includes a random value that is originally generated by and received from the tag and the challenge value.

6. The method of claim 5, wherein the handle comprising a new random value generated by the tag, and performing the tag authentication further comprises extracting a response challenge value by decrypting the response message, and performing an authentication based on whether the extracted response challenge value is equal to the challenge value included in the request message.

7. A communication data protection method using an RFID tag, the method comprising:
   transmitting, to a reader, tag information including security parameter information, protocol control bits, a cyclic redundancy check and an unique item identifier, the protocol control bits, cyclic redundancy check and the unique item identifier encrypted by a One Time Pad using a One Time Pad value generated by a symmetric key-based encryption algorithm;
   receiving, from the reader, a request message including a challenge value for replay prevention; and generating a handle in response to the request message and transmitting, to the reader, a response message including the handle and the challenge value, wherein the One Time Pad value is successively selected not to be overlapped among a plurality of One Time Pad values generated according to an Output Feedback (OFB) operation mode of the symmetric key-based encryption algorithm, and all messages transceived between the reader and the tag after the tag information is received at the reader are encrypted and transmitted.

8. The method of claim 7, further comprising:
performing an operation based on a received command when a reader command is received from the reader and another handle identical to the handle is included.

9. The method of claim 7, wherein the request message further comprises a random value originally generated by the tag and the handle comprises a new random value generated by the tag.

10. An RFID tag comprising:
a memory to store a security parameter and a security key value;
a signal processing unit to generate a One Time Pad value based on an Output Feedback operation mode using the security key value in a symmetric key-based encryption algorithm and to encrypt a transmission message to be transmitted to a reader using the One Time Pad value; and
a transmission unit to transmit messages to the reader,
wherein the signal processing unit generates a plurality of One Time Pad values based on the Output Feedback operation mode of the symmetric key-based encryption algorithm, sequentially selects the plurality of One Time Pad values so as to not be duplicated, and encrypts all transmission messages transceived between the reader and the tag after a security response message containing the security parameter is received from the tag at the reader using the sequentially selected plurality of One Time Pad values.

11. The RFID tag of claim 10, wherein the memory further includes a unique item identifier, protocol control bits and a cyclic redundancy check,
the signal processing unit encrypts the unique item identifier, protocol control bits and a cyclic redundancy check using the one time pad value, and
the transmission unit transmits the encrypted unique item identifier, protocol control bits and a cyclic redundancy check to the reader with the security parameter.

12. A communication data protection method, the method comprising:
transmitting a security command message including a random value request from a reader to a tag;
receiving the security command message including the random value request at the tag;
generating the random value at the tag;
transmitting, using the tag, the random value to the reader;
encrypting a security parameter setting information at the reader by performing an exclusive "OR" calculation of the security parameter using the random value;
receiving, from the reader, a setting command message including the encrypted security parameter setting information;
authenticating the reader at the tag using the random value;
setting a security parameter value of a security memory back at the tag based on the security parameter setting information; and
generating a response message including the random value and header information and transmitting the response message to the tag,
wherein all messages transceived between the reader and the tag are encrypted using an One Time Pad value successively selected not to be overlapped among a plurality of One Time Pad values generated according to an Output Feedback (OFB) operation mode of a symmetric key-based encryption algorithm.

13. The method of claim 12, wherein the setting command message further includes at least one of a command of the reader, the random value, and an error detection code.

14. A communication data protection method, the method comprising:
transmitting a security command message including a random number value request from a reader to a tag;
receiving the security command message including the random value request at the tag;
generating the random value at the tag;
transmitting, using the tag, the random value to the reader;
encrypting a most significant 16-bit value of a security key by performing an exclusive "OR" calculation of the security key using the random value;
receiving, from the reader, security key update key command;
decrypting the security key update command using the random value; and
setting a stored security key in tag memory based on the security key received from the reader, and transmitting a response message to the reader,
wherein all messages transceived between the reader and the tag are encrypted using an One Time Pad value successively selected not to be overlapped among a plurality of One Time Pad values generated according to an Output Feedback (OFB) operation mode of a symmetric key-based encryption algorithm.

15. The method of claim 14, wherein transmitting the security command message including the random value request is repeatedly performed a number of times equal to a total size of the security key divided by 16.

* * * * *